United States Patent [19]

Drake et al.

[11] 3,883,851

[45] May 13, 1975

[54] DATA PROCESSING ARRANGEMENTS

[76] Inventors: John Alfred Drake; Alan James Payne, both of Biggleswade; Andrew Ronald Reichert, Stevenage, all of England

[22] Filed: July 24, 1972

[21] Appl. No.: 274,831

[30] Foreign Application Priority Data

July 23, 1971 United Kingdom.............. 34683/71

[52] U.S. Cl. .............................................. 340/172.5

[51] Int. Cl. ........................................... G05b 11/00

[58] Field of Search .......... 340/172.5; 235/151, 152

[56] References Cited

UNITED STATES PATENTS

| | | | |
|---|---|---|---|
| 3,061,192 | 10/1962 | Terzian | 340/172.5 |
| 3,345,611 | 10/1967 | Eachus | 340/172.5 |
| 3,541,513 | 11/1970 | Patterson | 340/172.5 |
| 3,564,511 | 2/1971 | Restivo et al. | 340/172.5 |
| 3,602,899 | 8/1971 | Lindquist et al. | 340/172.5 |
| 3,657,705 | 4/1972 | Mekota et al. | 340/172.5 |
| 3,662,349 | 5/1972 | Bartlett et al. | 340/172.5 |
| 3,675,209 | 7/1972 | Trost et al. | 340/172.5 |
| 3,753,243 | 8/1973 | Ricketts et al. | 340/172.5 |

OTHER PUBLICATIONS

"PMC-1750, Programmable Matrix Controller," Publication No. SD23, August 1972, Allen-Bradley Co.

*Primary Examiner*—Paul J. Henon
*Assistant Examiner*—Michael Sachs
*Attorney, Agent, or Firm*—Keith Misegades

[57] ABSTRACT

A data processing arrangement is described which sets out to provide a universal linking processor between peripheral mechanisms and a central computer. The arrangement provides an input selection and masking unit, a processing unit for performing logic operations on the masked input selection and a selective masking output unit which responds to the result of the logic operations to produce an output signal pattern for energising only some of a total array of output lines. The processing unit has a program store from which instructions are selected in turn and by modifying the program of instructions which are present in the store the arrangement may be made to respond to various inputs, such as indicators, to produce mechanism function-control signals suitable to serve as the peripheral supervisory arrangement for a wide variety of different peripheral mechanisms.

4 Claims, 3 Drawing Figures

PATENTED MAY 1 3 1975

3,883,851

SHEET 3 OF 3

DATA PROCESSING ARRANGEMENTS

CROSS-REFERENCE TO RELATED APPLICATION

The present application is related to U.S. Pat. application Ser. No. 274,703 of even date, by the same inventors and assigned to the same assignee.

BACKGROUND OF THE INVENTION

1. Field of the Invention

The invention relates to data processing arrangements for controlling a plurality of outputs according to the states of a plurality of inputs.

2. Description of the Prior Art

Peripheral machines, such as printers, card readers, bulk stores, video terminals, for use in computer installations, are generally specially interfaced so as to communicate with the particular processor being used. Such communication to and from the intimate electronics of the peripheral machine will normally be via a standardised input-output or interface of the processor, coded line connections, and a particular input-output or interface of the peripheral machine.

Clearly, it would be useful to have a standard piece of apparatus that could take over the functions of at least the particular interface hardware of different peripheral machines without hardware modifications. This sort of function can be performed by a small computer, and so-called minicomputers are often used to control the operations of several peripheral machines simultaneously. However, such minicomputers are designed for more general purposes than controlling a mechanism directly on its intimate electronics.

The present invention sets out to provide data processing apparatus of the kind referred to above, in which a standardised arrangement may be used to fulfil the functions of the required interface between any of a number of different peripheral machines and the particular processor with which these are to be associated. For this purpose the individual arrangements at an interface are selected to match the characteristics of the individual peripheral machine and the processor by a program of instructions stored within the apparatus and the apparatus may be used in conjunction with different peripheral machines and for processors merely by changing the stored program. Consideration of the special input-output problems of such applications shows that there will generally be a plurality of outputs that require controlling in accordance with the states of plurality of inputs and functional relationships between those inputs and outputs representing a basic definition of the mechanism being controlled.

By way of example, a peripheral machine will typically consist of a mechanism arranged, in the case of an input peripheral, to acquire data from a source, which may be a document, such as a marked or punched sheet, or a web, such as a perforated or a magnetic tape, or even a keyboard operated mechanism, and to pass the acquired data to the central processor. In the case of an output peripheral, data resulting, say, from computations performed by the central processor is required to be applied to an output mechanism to be recorded, for example, on a document by printing or perforating, on to a web such as a paper or magnetic tape. In each case, however, in addition to a data item transfer highway over which the data itself is transmitted, there are of necessity various other input and output lines which are required, for example, for supervisory functions. Thus, in the case, say, of a document printer, there may well be a facility for checking that the peripheral mechanism is actually switched on; that a document is present and is correctly positioned to receive the printing; that an ink supply is available; that in between successive characters or lines of printing the position of the document or the printing head is modified as may be required. In addition to these checking facilities there will also need to be provision for activating the mechanism as the result of the checking indications. For example, in the case of the printer it may be required that if the document is not correctly positioned then the mechanism must be operated to correct the position of the document. Similarly the document handling part of the mechanism will need to be actuated to move the document as may be required during the transmission of data. It will be seen that similar considerations apply to other peripheral mechanism, where, apart from and in addition to the actual transmission of data, various mechanical operations will be required in order to make available the correct data items in the correct form at the correct times (as in the case of input peripherals) or to correctly record the available data in the appropriate form in a presented order as data items become available (as in the case of output peripherals).

These arrangements are usually made by the provision of electronic logic networks within the peripheral units, which may be termed "initimate electronics" of the peripheral mechanisms. Clearly each different kind of peripheral mechanism has heretofore required a different arrangement of "intimate electronics" but in all cases there are a number of input signals relating, for example, to the current states of parts of the mechanism and, as the result of the logical operations performed on these input signals, there will be generated a number of output signals to control the actuation of the mechanisms.

SUMMARY OF THE INVENTION

The present invention envisages data processing apparatus in which a single standardised unit may be used to serve as the "intimate electronics" of a wide variety of peripherals, the unit being arranged to respond at different moments to different selections of the available input signals to produce only selected ones of the possible output signals to control the actuation of the mechanism. The selection of the input signal lines, the actual logical operations and the selection of the output lines for energisation are all controlled by an inbuilt stored program. Hence, the behaviour and operation of any peripheral which is connected through the unit to a central processor is dependent upon the steps specified by the stored program and it follows that to alter the unit from the ability to control one peripheral to the ability to control another will involve only the change of the stored program itself.

According to the invention there is provided data processing apparatus for controlling a plurality of outputs according to the states of a plurality of inputs, such apparatus comprising means for storing program instructions defining functional relationships for predetermined groups into which said inputs and said outputs are separately divided, means operable according to stored program instructions for selecting any one of the input groups, means operable according to the result of processing operations for selecting any one of the groups, and means operable together with selection of the input and output groups for restricting access to individuals of a group.

Embodiments of the invention can in effect provide what might be called an "active" interface.

This, however, is not to imply that embodiments of the invention will not have useful application in other environments. There will be such utility especially in related applications such as process control, where for example, instead of changing the form of the data, as by recoring it in another form, the data is directly used to produce a controlling action, such as, for example to turn on or adjust a valve. This form of embodiment closely parallels the way in which, for example, more generally directed small computers are due to their particular architecture, sometimes specially suited to control of particular mechanisms either singly or collectively. Also, of course, there is no reason why embodiments of the invention should not be relatively large machines and/or control the operations of more than one mechanism simultaneously.

In accordance with another feature of the invention, the access restriction at the inputs may be achieved for a particular group of inputs selected in accordance with an order part of an instruction word by masking the selected group with a data word constituting a data part of the same instruction word. Such an instruction word may conveniently also include another order part specifying a destination address for the word resulting from the masking operation.

Also in accordance with a further feature of the invention, access restriction may be achieved for a particular output group by using part of a multibit word resulting from a processing operation as a mask for the outputs of that group. Other parts of the particular word may conveniently specify the identity of the group for selection purposes and/or a pattern of energisations to be applied, subject to masking, to the outputs of the group.

BRIEF DESCRIPTION OF THE DRAWING

One embodiment of the invention will now be particularly described, by way of example, with reference to the accompanying drawings which show, schematically, structural and operational features of apparatus able to function as a peripheral mechanism controller. In particular.

DESCRIPTION OF PREFERRED EMBODIMENTS

Figure 2:
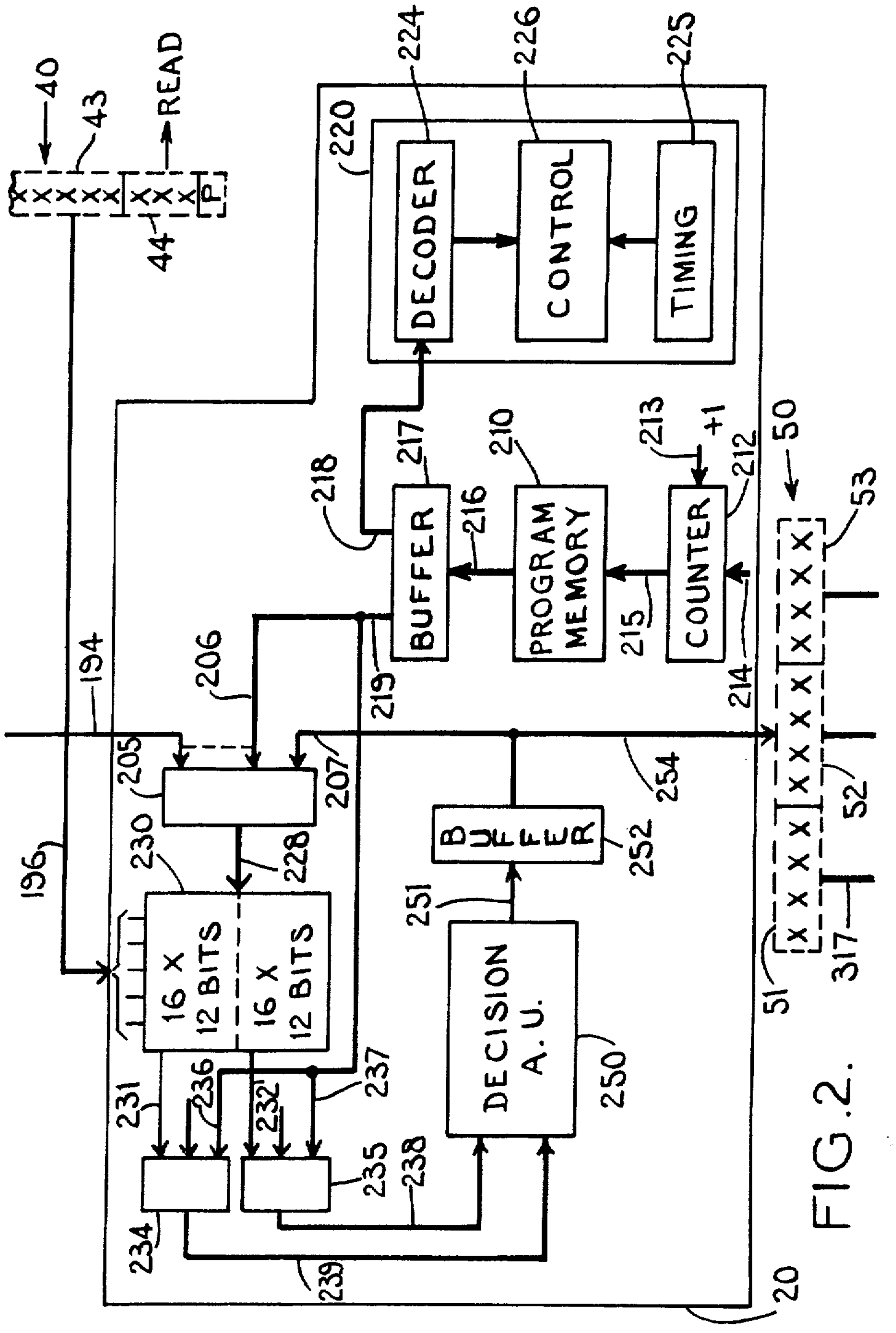
FIG. 2 shows the processing arrangement.
Figure 3:
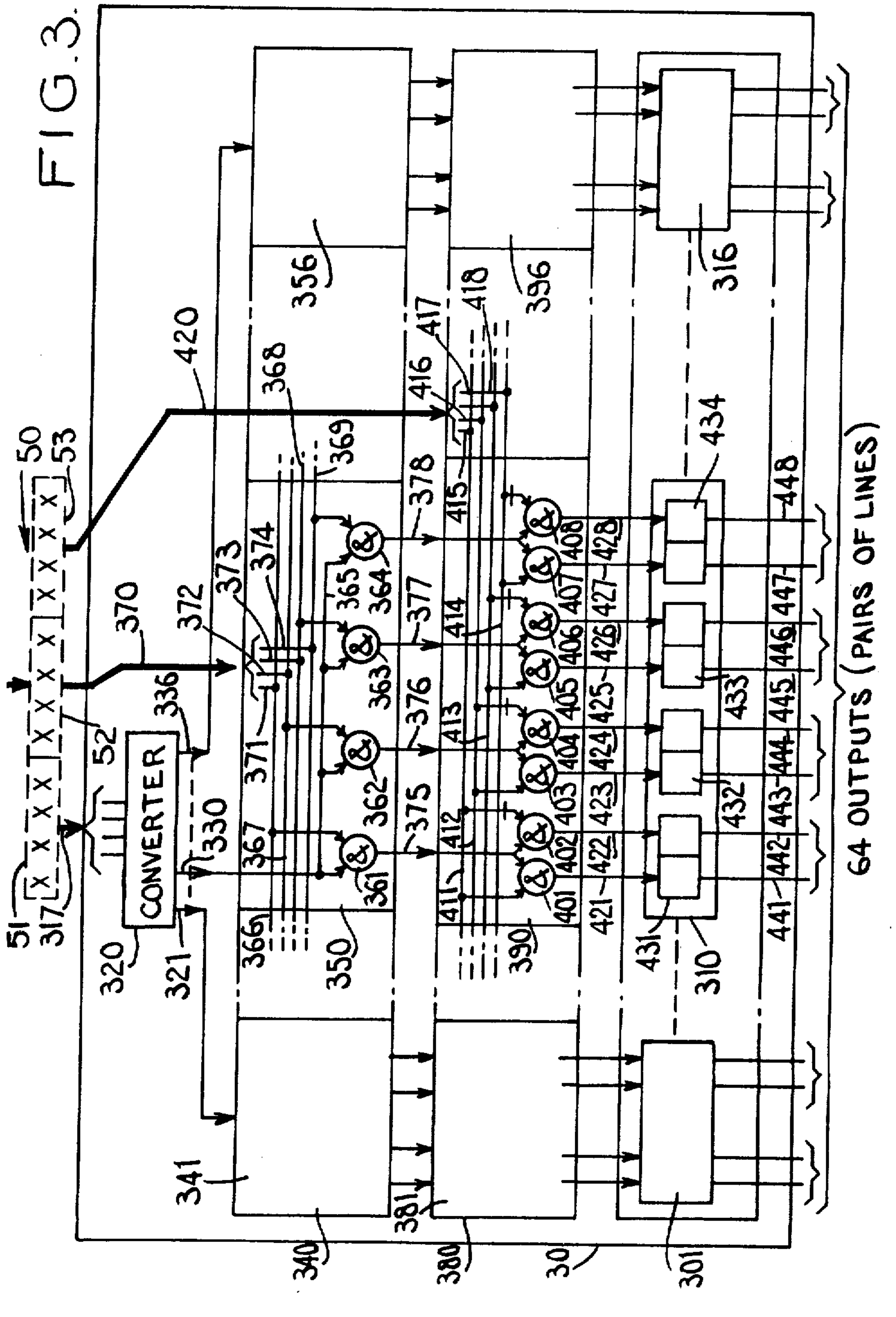
FIG. 3 shows the output arrangement.

Structurally, the illustrated apparatus comprises three basic blocks, namely, input multiplexing and masking block 10 (FIG. 1), processing block 20 (FIG. 2), and output selection and masking block 30 (FIG. 3).

In the input block 10 (FIG. 1), 96 inputs are indicated. They are divided into eight predetermined blocks of 12 inputs each. This is done using 12 eight-input multiplexors 101 to 112 each having three selection lines S1, S2, S3. Each multiplexor will provide at its output a different one of the inputs as specified by a binary word corresponding to the energisation pattern of the selection lines. The same selection line energisation pattern is applied from cable 114 simultaneously to all of the multiplexors 101 to 112, thereby selecting at the multiplexor outputs a 12 input group unique to the energisation pattern. The disposition of multiplexors is collectively referred to as a group selector 120 having outputs 121 to 132 from the multiplexors 101 to 112 respectively. Only the multiplexors 101 and 112, and the multiplexor outputs 121, 122, 131, 132, are specifically shown. The presence of the others is indicated by dashes and similar techniques are used elesewhere in the drawings.

It will be appreciated that the selection word cable 114 is actually provided from a register into which an instruction from an operating program may be entered. As will be described later instruction words are actually derived from the processing block 20 (FIG. 2). However, it is convenient at this point, for the purposes of explanation to regard the cable 114 as being derived from a three-bit field 41 of the order part of an instruction word 40. The instruction word 40 is shown as having a 12-bit order part 41, 43, 44 with each bit position indicated by e.g., a cross. The instruction word 40 also has a data part 42 shown without specific bit position indications. This data part 42 is used in a masking operation relative to the outputs 121 to 132 of the group selector 120 in a masking circuit 140 to be described.

The masking circuit 140 comprises 12 AND gates 141 to 152 each having a first input connected to a different one of of the multiplexor outputs 121 to 132, respectively, and a second input connected over lines 161 to 172, respectively, to be energised by different bits of the data part of the associated instruction word. This is indicated functionally by the cable 174 extending from the data part 42 of the instruction word 40.

The energisation of the second inputs of the AND gates 141 to 152 as just described, serves to enable selected ones of the multiplexor outputs 121 to 132. Those outputs that are not enabled will, in effect, present a predetermined one of the binary values on corresponding ones of AND gate outputs 181 to 192 regardless of the actual energisation of the multiplexor outputs. It will be clear that this type of input masking operation can be carried out equally well by enabling or disabling operation of appropriate ones of the multiplexors 101 to 112.

Figure 1:
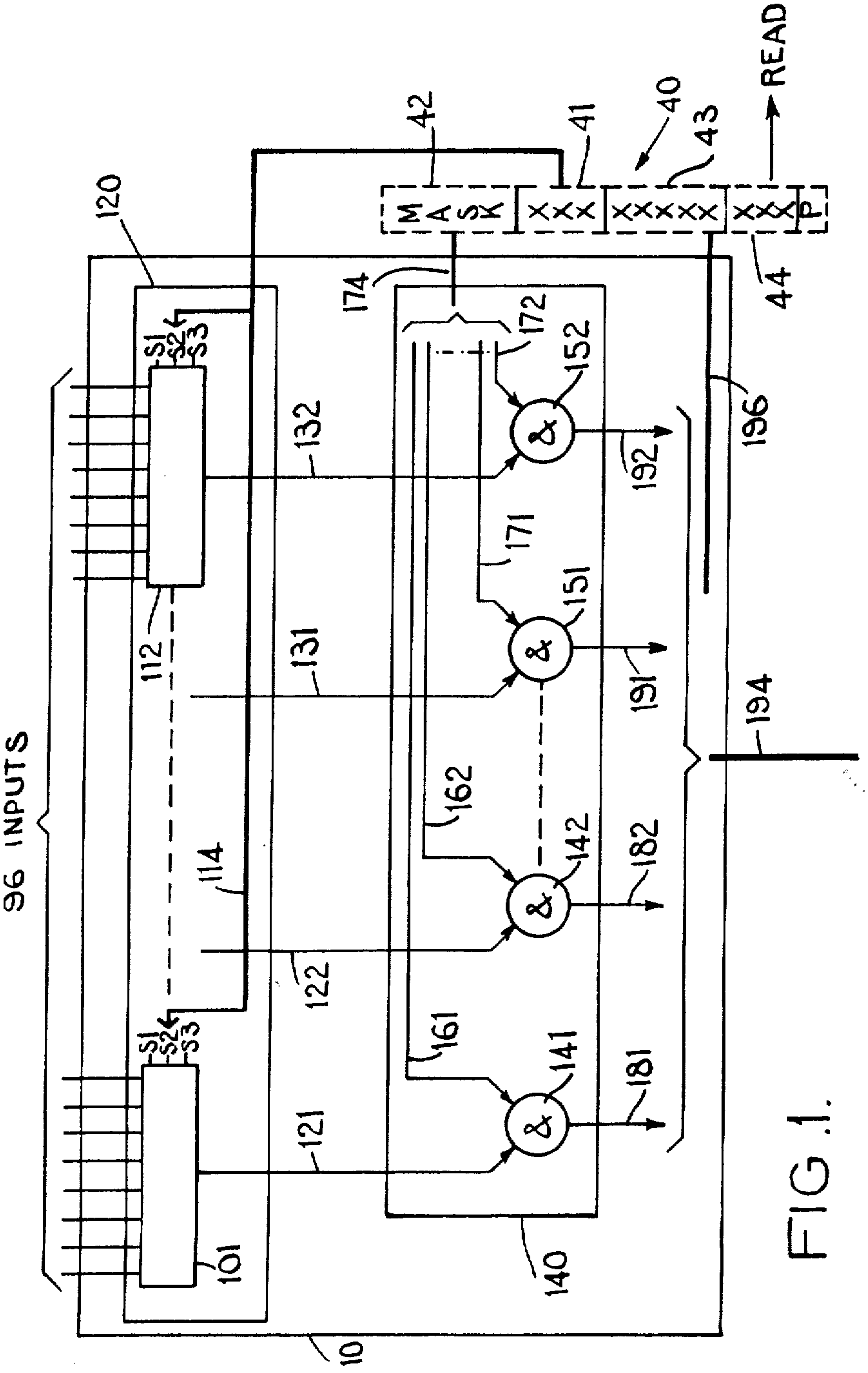
FIG. 1 shows the input arrangement.

The masked input group word is therefor present on lines 181 to 192 and is shown in FIG. 1 as leaving the input block 10 on cable 194. Thus, an instruction word 40 can select, by order part 41, any one of eight distinct 12-bit input words representing predetermined groupings of the 96 inputs to the multiplexors 101 to 112. Furthermore, by data part 42, the instruction word can also select any combination of the 12 bits of the chosen input word in a masking operation serving to ensure that all unselected bits are put to a predetermined binary value. The cable 194 transfers the output from the block 10 (FIG. 1) to the processing block 20 (FIG. 1). For convenience the fields 43 and 44 of the instruction word 40 are repeated in FIG. 2. The field 43 is shown to have five bits, which, in the present embodiment, serve to define an address to which the masked input word is to be sent. This addressing is performed via a five-line cable 196 normally controlled from within the processor block 20. The third order field 44 includes a parity bit P, and the remaining three bits define a function according to their values. In this case the values represent a masked read operation relative to the inputs to the block 10.

In the processor block 20, the masked input word available on the 12-line cable 194 is shown extending to an input of a multiplexor 205 having further inputs of which two 12-line cables 206 and 207 are shown. The processor includes a program memory 210 for storing instruction words completely specifying control functions for a peripheral machine which provides certain information (inputs on FIG. 2) in response to which various energisations or variations therein are required (outputs on FIG. 3) as a response. The program memory 210 may be a read only memory some or all of which will be replaced for controlling different machines. Alternatively, of course, a read/write memory may be used with a write facility provided for replacing the contents of the memory.

The program memory 210 is shown, conventionally, in a sequentially addressed configuration utilising an addressing counter 212 that is normally incremented by unity via lead 213 for each processor cycle. The output 215 of the counter 212 addresses the program memory 210. A multi-line input is shown to the counter 212 for program jumps.

The program memory is organised on a 24-bit word basis and will thus normally provide words similar to the instruction word shown at 40 on its output 216 which is taken to a buffer 217. The buffer 217 is shown with separate outputs 218 and 219 for the order and data parts respectively of an instruction word. The output cable 218 is shown extending to a control arrangement 220 and the output cable 219 is shown connected to the input 206 of multiplexor 205. The control arrangement 220 is shown to include an instruction decoder 224, timing circuits 225, and control circuits 226 which are operative to perform the various routing connections and function initiations required by instruction words.

As previously noted the instruction word 40 shown diagrammatically in FIG. 1 and FIG. 2 is actually derived from the program memory and in practice the buffer 217 forms a convenient register in which the word 40 would actually be available. Thus, it wil be realised that the cables 114, 174 and 196 shown in these Figures are actually provided from the buffer 217. For the sake of clarity in description, however, it is preferred to show an exemplary representation of the word 40 in order to demonstrate the manner in which it is made up from the various parts or fields 41, 42 43 and 44. It is also to be realised that the function field 44 is the field whose contents are in practice, passed through the decoder 224 to the control arrangement 220. Thus, the function which is required to be carried out is specified in the field 44, is decoded by the decoder 224 in the conventional manner and is passed to the control arrangement 226 which is arranged, again in the conventional manner, to generate control signals to provide appropriate gating connections and energising signals to the remaining elements of the processor block 20 to enable this block to carry out the processing operation specified by the instruction. The timing circuits 225 provide a sequence of timing signals to enable the passage of data between these various elements. The organisation of a processing control and timing arrangement for a logic unit making up a control processing unit for a computer is well known in the art, and the multiplicity of control lines provided in practice to interlink the elements of the processing block 20 are therefore omitted from the Figure for the sake of clarity.

The particular arrangement of registers of read/write storage and multiplexing to be described for the processing unit has certain advantages by way of permitting on one function, the use of two data sources and one destination.

The multiplexor 205 will, in practice, comprise 12 simultaneously operable units each concerned with a different bit. The output cable 228 extends to a 12-bit word organised memory 230 which takes the form of two separate sets of 16 word addresses or registers. Gating to the registers from the line 228 is controlled by the five bits on cable 196. At least when a masked input is concerned, the cable 196 can be energised according to the order part, field 43, of the instruction word 40.

Each set of registers has a 12-line output cable 231 and 232, connected to inputs of multiplexors 234 and 235 respectively, each similar to the multiplexor 205. These multiplexors 234 and 235 have other inputs 236 and 237 connected to the memory buffer data output 219. Further inputs would serve to provide predetermined input patterns, such as all ones or all zeros which it is generally convenient for the control arrangement 220 to be able to provide. Inputs for at least two such patterns would normally be provided, though only one is shown.

The multiplexors 235 and 234 supply outputs 238 and 239 respectively. These outputs are connected to an arithmetic unit 250 for making decisions basically by comparison and addition operations. Provision will also normally be made for the incorporation of units for accomplishing shifting and carry and error checking operations with appropriate multiplexing to the register sets 230 and/or the inputs of the multiplexors 234 and 235 and/or otherwise to the inputs of the arithmetic unit 250. The particular arrangement shown allows operations to take place between the outputs of the multiplexors 234 and 235. In general, this arrangement permits very fast operation without greatly affecting flexibility. There is a requirement, if speed is not to be sacrificed, for care in setting up the stored programs to avoid finding that two items of data are in the same set of registers when they are to be combinatively operated upon in the decision unit 250. In practice this is not found to be particularly restricting or unduly onerous.

The output of the decision arithmetic unit 250 feeds a buffer 252 which gives, on cable 254, the output of the processing block 20. This output 254 is tapped to provide a further input to the multiplexor 205. It is convenient for input to the program address counter 212 on cable 214 for program jumps to be taken from the output 228 of the multiplexor 205.

The two multiplexors 234 and 235 constitute separate sources of data and, on certain function instruction words, will simultaneously supply the decision unit 250. A corresponding 24-bit instruction word from the program memory 210 can specify that both multiplexors 234 and 235 pass a register ouput, i.e., select their inputs 231 and 232. In such a case, separate fields of that instruction word will address a register in each set thereof. It is convenient, then, for one of those addressed registers also to serve as the destination for the results of the specified function as available from the buffer 252. Other instruction words from the program memory 210 may, of course, supply data either to a register via the multiplexor 205, or to one of the multiplexors 234 and 235. In the latter case, a source register for the other of the multiplexors 234 and 235 can be specified which register may also serve as a destination for the function result in similar manner to that mentioned above. The setting of markers may also be accomplished by further instructions especially in order to cater for jumps.

The output 254 from the processing block 20 will carry a 12-bit word. This is represented at 50 in a similar manner to the representation at 40 of an input instruction word. In particular, the word is shown divided into three parts or fields 51, 52 and 53 each of which is shown as having four bits. The reason for this division will appear from consideration of the organisation of the output block 30 (FIG. 3). It is assumed that 64 outputs are to be served and these are controlled in 16 groups. Corresponding groups 301 to 316, each of four bistable devices, are shown for exercising output control according to their states. Only one group 310, of bistable devices is shown in detail. Each bistable device has two complementarily energised outputs in each stable state to which it is set according to which of two inputs was last energised.

Associated with each output group are two sets 340 and 380 of gating arrangements. One of these sets, 380, serves to establish an energisation pattern for a selected group and the other, 340, serves to mask out any desired one or more of the output bistable devices of that group so that its state remains unaltered regardless of the energisation pattern. The three parts 51, 52 and 53 of the output word 50 are repeated, for clarity, in FIG. 3, and serve to (a) select one of the 16 output groups, (b) mask the selected group, and (c) define an energisation pattern, respectively.

The first output word part 51 is fed over cable 317 to a binary to one-out-of-16 converter 320 having 16 outputs 321 and 336. A different one of these outputs 321 to 336 is energised for each possible energisation combination of its four inputs from cable 317. The converter output 330 corresponding to the output group 310 is shown extending to the corresponding one, 350, of the gating arrangements 341 to 356 making up the masking set 340.

Each of the masking gating arrangements, e.g., 350 comprises four two-input AND gates 361 to 364. One output of all of these four gates is connected, via a line, 365, unique to that gating arrangement, to be energised in an enabling sense for the gate concerned by the corresponding output, 330, of the converter 320. The other inputs of the gates, 361 to 364 are each connected to a different one of lines 366 to 369, respectively, which are connected to be energised according to different bits of the output word part 52 as indicated by cable 370 and lines 371 to 374. The lines 366 to 369 extend, in similar manner, to all of the gating arrangements 341 to 356. In operation, the digits of the output word part 52 will cause, via line 366 to 369, enablement of the same specified ones of each of the gating arrangements 341 to 356, via their AND gate second inputs. One output only of the converter 320 will be energised to enable AND gates, so that only one gating arrangement, e.g., 350, will have its AND gate first inputs enabled. Only the specified one of the AND gates of that arrangement will have its second input enabled, so that only one of the gate arrangement outputs, e.g., 375 to 378, will be energised.

The output lines of each of the gating arrangements 341 to 356 are connected as inputs to a corresponding one of the gating arrangements 381 to 396 of the set 380.

Considering the arrangement 390 corresponding to that, 350, described in detail for the masking set 340, each of the lines 375 to 378 is connected to one input of each of a pair of two-input AND gates 401 and 402, 403 and 404, 405 and 406, 407 and 408, respectively. A first gate 401, 403, 405, 407 of each of these pairs of AND gates has its other input connected to a different one of the lines 411 to 414.

The second gate, 402, 404, 406, 408 of each AND gate pair also has its other input connected to the lines 411 to 414, respectively, but via inverters indicated by bars in FIG. 3. In this way, the other inputs of the AND gates of each pair will, when energised, carry complementary signals. In effect, this ensures that one or the other of the AND gate outputs 421 and 422, 423 and 424, 425 and 426, 427 and 428 of each pair will be energised if the first inputs are energised by the outputs of the masking set.

As shown, the lines 411 to 414 are connected via the lines 415 to 418, respectively, and cable 420 to be energised according to different bits of the output word part 53. Furthermore, the lines 411 to 414 extend to, and are similarly connected within, all of the gating arrangements 341 to 356.

In operation, the bits of the third part 53 of an output word 50 specify, via lines 411 to 414, the same particular AND gate output energisation pattern for each of the gating arrangements 381 to 396.

This pattern will only occur in its entirety if a gating arrangement 381 to 396 has all its inputs from the corresponding one of the mask gating arrangements 341 to 356 energised in an enabling sense. In fact, only one of the gating arrangements 341 to 356 will have any of its outputs so energised and those that are so energised will be specified by the output word part 52. Only for those AND gate pairs corresponding to the selected marking gating arrangement will parts of the energisation pattern permit an output line pair energisation from a gating arrangement 381 to 396.

Each pair of outputs from one of the pattern gating arrangements 381 to 396 is connected to the inputs of a unique bistable output device whose outputs control a particular parameter of the peripheral machine to be controlled. As previously mentioned, the bistable devices are arranged in groups of four, 301 to 316. The group 310, corresponding to the gating arrangement 390 is shown in greater detail. It includes four bistable devices 431 to 434 having pairs of inputs connected to the pattern output line pairs and pair of outputs 441 and 442, 443 and 444, 445 and 446, 447 and 448, respectively.

The output block 30 of FIG. 3, is thus operative, in accordance with a single 12-bit output word, to (a) select a particular predetermined group of four of 64 output line pairs to be controlled, (b) specify an energisation pattern for the four output line pairs of the selected group, and (c) ensure that the pre-existing energisation is unchanged for those lines which have been so masked that they are inhibited from inclusion in a final selection of lines within the selected group.

A book entitled "Electronic Digital Computers" by Charles V. L. Smith, published by the McGraw-Hill Book Company in 1959, and its impact on the blocks shown in the drawings of the present application may be shortly summarized as follows.

The block 210 is a program memory which reads instructions into a buffer 217 in response to an updated address derived from the counter 212. In the Chapter 14, entitled "The Memory" typical storage devices are described and, in particular, a core memory which performs the same general task as does the block 210 is described in the Section 14-2 of this chapter. In Section 15-2 of the following chapter, on "The Central Control" is described the operation reading successive instructions from a store.

The block 220 consists of a decoder (224) which responds to the function field of the word in the buffer 217 to produce an output from which specific control lines are to be energized by the control unit 226. This kind of decoding and control operation is described in the book, for example, as applied to program controls of various kinds in the chapter on "The Central Control." Typically, one form of this kind of decoding and control line energization is illustrated in Table 15-1 and FIG. 15-1. Other examples are given in succeeding sections of the chapter, which also include descriptions of timing pulse generation. In this connection, the block 220 of the present specification also includes a timing block 225.

The block 250 is an arithmetic decision unit, and as such its operation is regulated by the requirements of the specific peripheral unit to which the controller is to be attached. These requirements are specified as coded operation instructions in the instructions derived from the buffer 217, typically over lines 219 and 218. The line 218 carries the data to the block 220 whose operation is reviewed above. The control unit 226 of this block then conditions various gating arrangements to permit the processing of data from the registers 230 according to the required logical operation. Thus, the operation of the block 250 will be in the manner typically described in Chapter 13 of the book, entitled "The Arithmetic Unit," and which discloses how values from a register, or registers, may be substituted, added, or otherwise combined by the actuation of gating arrangements in response to e.g., signals "from arithmetic control" (see FIG. 13-1). The results of such operations are then typically made available through an output buffer. This is the kind of operation performed by the block 250 in providing an output to the buffer 252 of the present case.

Finally, the block 320 is a simple binary to "one-of 16" decoder and as such is very well known. Typical binary decoding trees are shown in Chapter 7 ("Higher-order Logic Circuits") of the book and are illustrated, for example, at FIGS. 7-6 to 7-8.

All the foregoing kinds of operations are shown and described in an earlier U.S. Pat. No. 3,117,220, by J. H. Wensley and assigned to assignee under its former name of International Computer and Tabulators Limited.

Thus, a main memory (27) is interrogated under control of a register which holds an address, and the word read out is presented at an output register (3) (operation of block 210).

In this particular case the word read out may, in fact, be an instruction which is passed into the program instruction ring of registers (34–36). Such an instruction is analyzed in the register 34 from which a function field is connected to a function decoder (56). This decoder energizes control lines (57*a–d*) which, according to the function to be performed actuate various gating arrangements throughout the processor at times decided by a pulse generator (59) (operation of block 220).

In one form of operation, data from registers (1–3) is recirculated through an arithmetic unit (adder/substractor 13) under control of gating signals derived from the function decoder and these data are thus combined in various ways according to the function specified (operation of block 250).

Binary code conversion is generally performed throughout this earlier apparatus. For example, the binary digits D–F of register 34 are decoded (or converted) into a store address, which involves the selection of the required address lines of the store. In the present application the binary digits of field 51 are decoded by the decoder 320 into the one required "address" line out of 16. As noted earlier this is the most elementary form of decoding by a simple binary tree and is very well known, per se.

Clearly, the logic of the output block 30 could be very different and still obtain the same result. For example, the various gate output energisations could be reversed by using further inverters. Also, a masking set 340 of gating arrangements might succeed, rather than precede, the energisation pattern set 380.

There is no particular significance in the described use of 12-bit data words. A larger machine could clearly utilise longer data words. Equally, smaller words can be used. The particular described embodiment is, in fact, readily amendable to modular construction using four-bit modules.

Also, the number of inputs and outputs can be different so long as the unavoidable time penalty is acceptable, the number of inputs or outputs served can be greater than the actual number provided if one or more of the groups are used for giving access to multiplexed additional inputs or outputs.

If the control of more than one peripheral machine at a time is contemplated, it may be that some input multiplexors will be incorporated in the machines to be controlled along with output bistable devices that may be necessary for control of the input multiplexors. More than one level of multiplexing may be provided for in such applications.

We claim:

1. A peripheral unit function control device for a data processing system, including a plurality of groups of input lines; a plurality of output lines; means for storing program instructions, each instruction having at least a function field specifying a functional linkage to be set up between input and output lines, an input group selection field and an input mask field; an instruction register arranged to receive a selected instruction from the store; means connected to the instruction register responsive to the input group selection field of an instruction in the instruction register to select a plurality of input lines, one from each group; gating means responsive to the input mask field to enable only prescribed ones of the selected lines; processing means connected between the selected input lines and the output lines including gated paths arranged to condition the output lines to fulfil a functional linkage in response to the enablement of input lines; and control means responsive to said function field to render different ones of said gated paths effective to carry signals in dependence upon respectively different functional linkages specified by said function field.

2. Apparatus as claimed in claim 1 in which the processing means includes a plurality of addressable storage registers, an arithmetic unit and an output buffer interconnected by gated paths; in which the instruction further contains an address field specifying the address of one of said storage registers, the processing means responding to the address field to connect the enabled lines to the addressed storage register to enter signals therein from those lines; the control means being further responsive to the function field to control the gated paths to permit the arithmetic unit to enter a resultant word into the output buffer and in which the processing means further includes means connected to the output buffer to register the resultant word and output line gating means resonsive to a word in the registering means to render effective only a selected group of output lines.

3. Apparatus as claimed in claim 2 in which the registered word includes at least an output group selecting field and an output mask field and in which the means responsive to the registered word includes control elements operable to condition the output lines; means responsive to the output group selecting field to select a single group of line control elements and gating means responsive to the output mask field to enable only prescribed ones of the selected control elements.

4. Apparatus as claimed in claim 3 in which the control elements are bistable elements each connected to a pair of output lines, the output lines of a pair connected to a single bistable element carrying complementary signals, and in which the prescribed bistable elements are switched from a first to a second stable state under control of said gating means.

* * * * *